US010152693B2

United States Patent
Tayarani et al.

(10) Patent No.: US 10,152,693 B2
(45) Date of Patent: Dec. 11, 2018

(54) MECHANISM FOR MONITORING COLLABORATION

(71) Applicant: SuccessFactors, Inc., South San Francisco, CA (US)

(72) Inventors: Mahdi Tayarani, Vancouver (CA); Jeff Gan, Vancouver (CA)

(73) Assignee: SuccessFactors, Inc., South San Francisco, CA (US)

(*) Notice: Subject to any disclaimer, the term of this patent is extended or adjusted under 35 U.S.C. 154(b) by 409 days.

(21) Appl. No.: 14/958,416

(22) Filed: Dec. 3, 2015

(65) Prior Publication Data

US 2017/0161682 A1  Jun. 8, 2017

(51) Int. Cl.
*G06Q 10/10* (2012.01)
(52) U.S. Cl.
CPC .................. *G06Q 10/103* (2013.01)
(58) Field of Classification Search
None
See application file for complete search history.

(56) References Cited

U.S. PATENT DOCUMENTS 9,195,912 B1 * 11/2015 Huang .............. G06K 9/00288

OTHER PUBLICATIONS

Sebastian Alexander Max Dumcke, Statistical Methods for the Inference of Interaction Networks, 2014. pp. 1-128.*

* cited by examiner

*Primary Examiner* — Tuankhanh D Phan
(74) *Attorney, Agent, or Firm* — Schwegman Lundberg & Woessner, P.A.

(57) ABSTRACT

Methods, systems, and computer program products for monitoring collaboration between members of a group and providing feedback are described. A count of group members m of a group G, a count of group items i, and a characteristic of an action a performed by a member m on an item i, where $a \in A$, $m \in M$, and $i \in I$, are obtained. A member-item score is computed for a time quantum $T_q$, where the time quantum $T_q$ is a fixed-length amount of time with an arbitrary start point. A collaboration score $Q_G$ for the group G is computed, where $Q_G = \Sigma_{\forall m \in m} \Sigma_{\forall i \in I} Q_{m,i}$.

19 Claims, 6 Drawing Sheets

MECHANISM FOR MONITORING COLLABORATION

FIELD

The present disclosure relates generally to a mechanism for monitoring activity utilizing collaboration tools and infrastructure. In an example embodiment, the disclosure relates to monitoring collaborative work, tasks, and interactions and providing feedback that includes a collaboration metric(s).

BACKGROUND

Enterprise social software is an emerging business tool that helps an enterprise socially connect their employees, customers, suppliers, and the like in driving business processes and decisions to, for example, increase bottom-line margins. Users of the system are assigned to groups in which they socially interact with each other. The interactions may be, for example, regarding work-related tasks.

SUMMARY OF THE INVENTION

In some implementations, methods and apparatus, including computer program products, are provided for monitoring activity utilizing collaboration tools and infrastructure. In one aspect, a count of members m of a group G and a count of items i of the group G are obtained. A data structure is accessed for a characteristic of an action a performed by a member m on an item i, where $a \in A$, $m \in M$, and $i \in I$. A member-item score $Q_{m,i}$ is derived and a hardware-based collaboration scoring function is executed to generate a collaboration score $Q_G$ of the group G where $Q_G = \Sigma_{\forall m \in M} \Sigma_{\forall i \in I} Q_{m,i}$. The collaboration score $Q_G$ is provided.

In one aspect, a count of members m of a group G and a count of items i of the group G are obtained. A data structure is accessed for a characteristic of an action a performed by a member m on an item i and a member-item score $Q_{m,i}$ is derived. A hardware-based collaboration scoring function is executed to generate a collaboration score $Q_G$ of the group G, where the collaboration score $Q_G$ is a summation of a plurality of member-item scores $Q_{m,i}$, and the collaboration score $Q_G$ is provided.

The above methods, apparatus, and computer program products may, in some implementations, further include one or more of the following features.

A member may be any entity that is capable of performing the action a on the item i of the group G and the characteristic of the action a may be a count of times the member m performed the corresponding action a with the item i during a specified time period $T_q$. The collaboration score $Q_G$ may be presented in a user interface of a collaboration tool.

The member-item score is defined by $Q_{m,i} = V(\vec{A}_{m,i}) \cdot \vec{C}_G$ for a time quantum $T_q$, where the time quantum $T_q$ is a fixed-length amount of time with an arbitrary start point, vector $\vec{A}_{m,i}$ is defined as a vector comprising a component for each type of action a that a member m can perform utilizing the item i, V is a valuation function which values each action component in the action vector $\vec{A}_{m,i}$ and generates a valued action vector $V(\vec{A}_{m,i})$, and each component of the coefficient vector $\vec{C}_G$ is defined as $$C_a = \frac{K_{ca}}{|M| \times |I_{NZ}|},$$

where $|M|$ is a count of members in group G, $|I_{NZ}|$ is a total count of items i in the group G which have a non-zero action vector, and $I_{NZ}$ is a subset of items I of group G where at least one member m has performed at least one action a on the item i during the time period $T_q$.

The vector $\vec{A}_{m,i}$ and the valued action vector $V(\vec{A}_{m,i})$ may have a different number of dimensions. The obtaining operation may be performed for a time quantum $T_q$. In one example embodiment, $Q_m$ is a member score which denotes how much member m interacts with all items in the group G, and $Q_m = \Sigma_{\forall i \in I} Q_{m,i}$ and $Q_i$ is an item score which denotes how much item i is being acted upon, and $Q_i = \Sigma_{\forall m \in M} Q_{m,i}$.

The valuation function satisfies the following conditions:

$$V_a(0) = 0$$
$$\lim_{n \to \infty} V_a(n) = K_{va}$$

where $V_a(n)$ represents a value of the member m performing an action a a total of n times during the time quantum $T_q$, and $K_{va}$ is a constant signifying a maximum valuation for action a during time quantum $T_q$.

A component of the coefficient vector $\vec{C}_G$ may be defined as $$C_a = \frac{K_{ca}}{|M| \times |I_{NZ}|},$$

where $|M|$ is the count of members m in group G, $|I_{NZ}|$ is a total count of items i in the group G which have a non-zero action vector, and $I_{NZ}$ is a subset of items I of group G where at least one member m has performed at least one action a on the item i during the time period $T_q$.

A frequency distribution function may be computed, the frequency distribution function being a histogram of a count of times a defined type of action is performed by one or more members of one or more groups. The frequency distribution function may be converted into a probability distribution function by dividing each entry in the histogram by a total number of occurrences of the defined type of action, and the probability distribution function may be converted into a cumulative distribution function. The cumulative distribution function is used as a valuation function for the defined type of action. The valuation function and the coefficient vector may be determined using a machine learning technique.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1A:
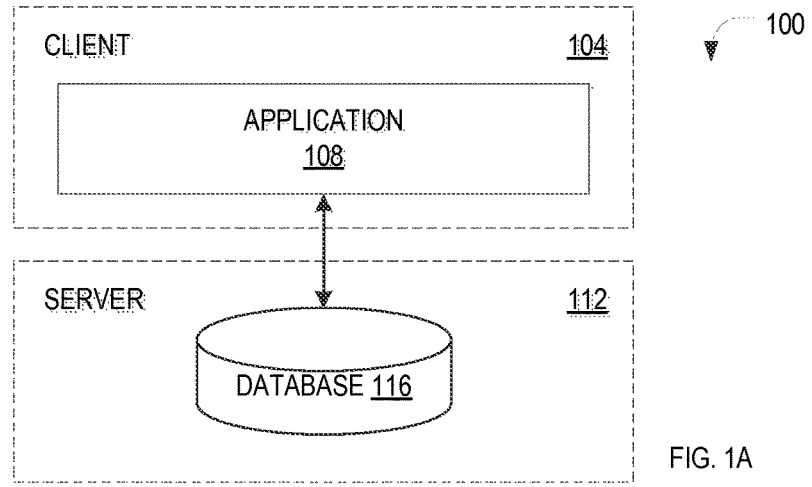
FIGS. 1A and 1B illustrate schematic diagrams of example systems for monitoring collaboration between members of a group and providing feedback that includes a collaboration metric(s), in accordance with an example embodiment.

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures and techniques have not been shown in detail.

Generally, methods, systems, apparatus, and computer program products for monitoring activity utilizing collaboration tools and infrastructure, and providing feedback that includes a collaboration metric(s) are described. Enterprise social software is an emerging business tool that helps an enterprise socially connect their employees, customers, suppliers, and the like in driving business processes and decisions. Users of the system are assigned to groups in which they socially interact with each other. In one example embodiment, a key feature of social software is the ability to quantify the level of interactions between users in a group as part of an analytics dashboard. This is defined as a collaboration score of the group.

A collaboration score is, for example, a single metric that represents the health of a group of users (i.e., that represents the amount of interaction between members of a group). It can be used to incite actions by, for example, the group administrator to help improve the collaboration/adoption of the group. It may help business owners and managers understand how well their employees are using collaboration tools. The score combines multiple measures of actions performed by members in a group, such as uploading new documents, viewing and liking content, posting updates, and many other data points that are a result of collaboration.

In one example embodiment, a collaboration score is derived which measures the level of interaction between members of a group. Interactions may be direct, such as a message between members, or indirect, such as two members editing the same document. In one example embodiment, the score is a single value representing a complex aggregation and weighting of multiple common social actions such as uploading, sharing, viewing, liking, commenting on content, and the like. The score may be normalized to accommodate groups of different types and sizes. The score helps business owners, managers, and other users monitor and improve group adoption and engagement, lower the cost of group ownership, and justify the investments in social software for their business. The score may be utilized in enterprise social software implemented, for example, in a cloud environment.

The collaboration score provides a single, convenient, and quantifiable way to sum up the health of a group, such as to compare a group with 100 members and 100 items with 50 views and 50 comments and a group with 50 members and 20 items with 150 views and 20 comments. The collaboration score helps determine which group is healthier.

The collaboration score may be normalized so that a large community group with more members and items does not automatically receive a higher score compared to a small group with fewer members and items, assuming, for example, that every member is engaging with every item in the corresponding group. Normalization is based, for example, on a count of members and a count of items corresponding to each group. The definition of the score is also generic and flexible to allow continuous refinements in its accuracy.

Members, Groups, Items, and Collaboration

In one example embodiment, a mediator is implemented between group members (e.g., content producers and content consumers) that collaborate with each other. A group (G) is a set of members (M). In one embodiment, members of a group are the users who are assigned to or join the group. In one embodiment, members of a group are any users who perform an action on an item in a group. In one embodiment, any entity that is capable of performing an action on an item of a group may be a member of a group, including a person, a software entity (e.g., an automated software program for creating and/or modifying an item), a hardware device (e.g., a state machine), and the like. Aside from members, a group has content produced and/or used by the members of the group (known as items (I) hereinafter). Examples of content include documents, messages, posts, wiki's, blogs, events, files (e.g., multi-media files), forums, business records, question and answer sessions, and the like. Direct interaction between the members, and higher levels of indirect interactions, are captured, stored, and exposed to members through a collaboration score Q. It is noted, for example, that the performance of an action with an item of the group is indicative of collaboration of a member with other members of the group, as interactions between members are typically through an item, such as modifying the contents of a document, wiki, blog, and the like, and conducting a conversation by posting comments and replies on any form of social interaction (e.g., liking a comment of a document, tagging a keyword or a member, annotating content, and the like).

$Q_G$ is the collaboration score for the group G. $Q_G$ reflects how well the members of group G are collaborating with each other. Each member m is assigned a score $Q_m$, which denotes how much member m interacts with items I in the group. Each item i draws interactions from members, and is assigned a score of $Q_i$, which denotes how much (e.g., how often) item i is being interacted upon.

Members are the source of interaction and items draw direct/indirect interactions. Thus, collaboration is measured at an item and member granularity, i.e., by computing how much a given member m interacted with a specific item i in the group G (generating member-item collaboration score $Q_{m,i}$). The definitions of other collaboration scores are as follows:

Member m's collaboration score: $Q_m = \Sigma_{\forall i \in I} Q_{m,i}$ (1)

Item i's collaboration score: $Q_i = \Sigma_{\forall m \in M} Q_{m,i}$ (2)

Group G's collaboration score: $Q_G = \Sigma_{\forall m \in M} \Sigma_{\forall i \in I} Q_{m,i}$ (3)

Computing $Q_{m,i}$

Collaboration of a member m and item i quantified by in group G (quantified by $Q_{m,i}$) is defined over the time quantum (also known as a time period hereinafter) $T_q$, a fixed-length amount of time (e.g., one week) with an arbitrary start point. The collaboration score for a time period that spans multiple time quantums $T=kT_q$ is an aggregation of k consecutive collaboration scores, each over $T_q$, where the first one starts when T starts and each other $T_q$ starts where the previous one ends. In one example embodiment, aggregation is the average of the k data points. Collaboration scores over periods less than $T_q$ could be defined as if no further collaborations were done for the rest of the time period or use a predicting method to interpolate collaboration over the remaining time.

The social collaboration mechanism allows a member m to interact with an item i through a variety of actions. The vector $\vec{A}_{m,i}$ is defined as an action vector comprising a component for each type of action that a member m can perform utilizing the item i. In one example embodiment, the value of a component is a characteristic of the action, such as the count of times the member m performed the corresponding action with the item i during a specified time period $T_q$. For example, consider the action of viewing an item. If, during the time period $T_q$, the member m viewed the item i ten times, the action vector for m will have the quantity ten for the vector component representing the viewing action.

Other metrics that capture the quality of actions may also be used as the value of a component. In one example embodiment, the value of a component is the percentage of a member's work time that was spent performing the corresponding action with the item i. In one example embodiment, a duration of an action (i.e., for how long the action was performed) and/or the distribution of actions over time (e.g., all actions of a specified type occurring in parallel, all actions of a specified type occurring over a week, and the like) may also be used as a value of a component. For example, assume the action is viewing an item. The metrics may be, for example, the number of times the item was viewed, the average time spent viewing the item, the average time between views, the percentage of time viewing the document (of the total time the member spent on the social software), and the like.) In one example embodiment, different actions are weighted differently in computing the member item score $Q_{m,i}$. For example, coefficients may be defined to appropriately weight each type of action:

$Q_{m,i} = V(\vec{A}_{m,i}) \cdot \vec{C}_G$ (4)

The function V is a valuation function that takes the action vector $\vec{A}_{m,i}$ as input and outputs the valued action vector $V(\vec{A}_{m,i})$. In one example embodiment, the action vector $\vec{A}_{m,i}$ and the valued action vector $V(\vec{A}_{m,i})$ have the same number of dimensions. In one example embodiment, the action vector $\vec{A}_{m,i}$ and the valued action vector $V(\vec{A}_{m,i})$ have a different number of dimensions. For example, as shown in Example 2 below, an input vector may have three dimensions: views, comments, downloads. Since the view and comment actions belong to the general category of consumption, the value function has 2 dimensions: consumption and comments. Valuation assigns a value to the member's action(s) of each specific action type based on the number of times the member m performed the action. For example, by having the member m view the item i ten times, the valuation function yields a value of 5; by having the member m view the item i twenty times, the function yields a value of 7. The vector $\vec{C}_G$ is a constant vector defined specifically for group G based on the characteristics of group G, as described by way of example more fully below. It is multiplied with the valuation vector using the dot product function to produce the scalar value of $Q_{m,i}$. It is defined in a way to combine relative values ("weights") of different types of actions with each other to sum up the final score. For example, if the member m views the item i ten times (yielding a value of 5), and if the member m posts a comment on the item i three times (yielding a value of 25), the final score for that member-item pair is 30. Any manual adjustments desired to favor certain actions over others are applied to each element of the constant vector. Also, if a group is configured to disallow certain actions, the respective entry in the vector should be zero. For example, groups that do not allow users to upload new content should have a zero for the constant corresponding to the upload action.

Normalizing Scores

In one example embodiment, the overall collaboration score, for example, is expected to be bounded. In this case, keeping a score of a group within pre-determined bounds imposes some properties on the valuation function and constant vector. The valuation function operates on each element of the action vector. A member can perform no actions to an item, or, theoretically, perform an action an infinite number of times to an item. Thus, the valuation function should satisfy the following conditions:

$$V_a(0) = 0 \quad (5)$$

$$\lim_{n \to \infty} V_a(n) = K_{va} \quad (6)$$

where $V_a(n)$ represents the value of the member m performing action a a total of n times during the time period $T_q$. $K_{va}$ is a constant signifying the maximum valuation possible during the time period $T_q$.

In one example embodiment, the constant vector is defined specifically for group G. Let $|M|$ denote the number of members in G, and $|I_{NZ}|$ denote the total number of items in the group that have a non-zero action vector. In other words, $I_{NZ}$ is the subset of items of group G where at least one member has performed at least one action on the item during the time period $T_q$. $C_a$ denotes the element of $C_G$ associated with action a:

$$C_a = \frac{K_{ca}}{|M| \times |I_{NZ}|} \quad (7)$$

As a result of equations 5, 6, and 7:

$$0 \leq Q_{m,i} \leq \frac{\sum_{a \in A} K_{va} \times K_{ca}}{|M| \times |I_{NZ}|} \quad (8)$$

Combining equation 3 and 8 results in:

$$0 \leq Q_G \leq \Sigma_{a \in A} K_{va} \times K_{ca} \quad (9)$$

For simplicity, define $K'_{va}=1$ and $K'_{ca}=K_{va}K_{ca}$ which, for simplicity, would change equation 6 to become:

$$\lim_{n \to \infty} V_a(n) = 1 \quad (10)$$

The values of $K_{ca}$ are set based on group characteristics and can also be manually adjusted to favor certain types of actions over others.

Refinements: Valuation Functions

In one example embodiment, historical information about previous actions of the members are obtained and stored. This information can be leveraged to assign values to future actions. By looking at the historical distributions of the frequency of members performing each action, a member's actions are evaluated and used, for example, to determine the valuation function.

In one example embodiment, a first step is to compute the frequency distribution function, which is a histogram of how many times a specific action is performed by members in similar groups. The histogram is converted into a probability distribution function (PDF) by dividing each entry by the total number of observed actions. The PDF is converted into a cumulative distribution function (CDF), which is used as a valuation function for the specified action.

Constant Vectors

One guideline in defining the constant vector is to use information theory when assigning weights to action types. This means the more frequent an action, the less valuable it becomes. Conversely, performing rare actions has more weight compared to actions that are more frequent.

Scaling

In one example embodiment, an optional scaling is applied after the final score for a group is computed. The scaling function is monotonically increasing and has an output range equal to its input domain. Scaling is performed consistently on all groups so that the average score of all groups can be brought into a reasonable range as determined by, for example, the business owner, administrator, user, and the like of the collaboration monitor.

Leaderboards

Figure 4A:
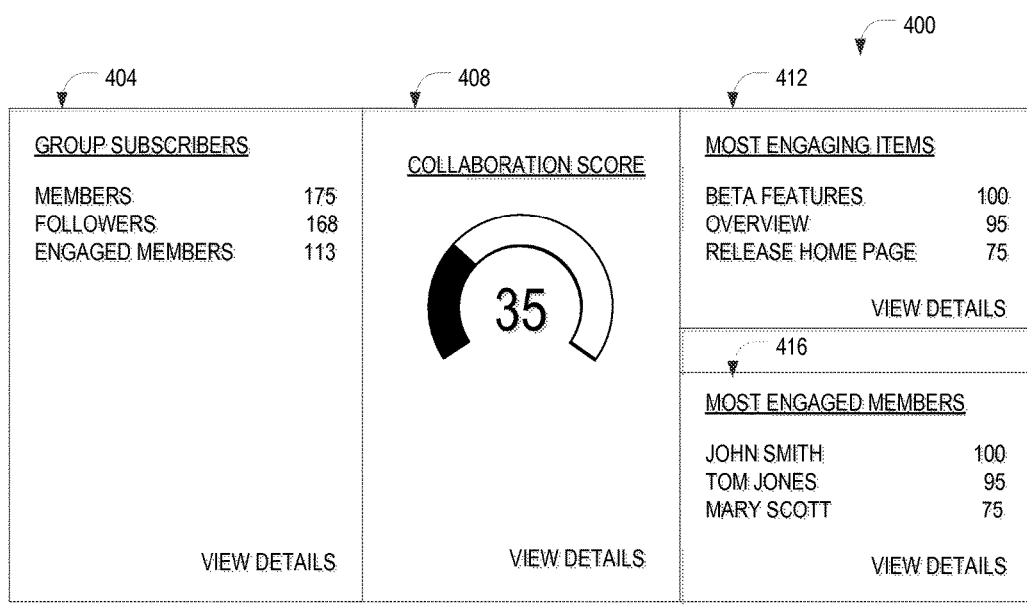
FIGS. 4A-4C are graphical representations of example user interfaces for monitoring collaboration between members of a group, in accordance with an example embodiment.
Figure 4B:
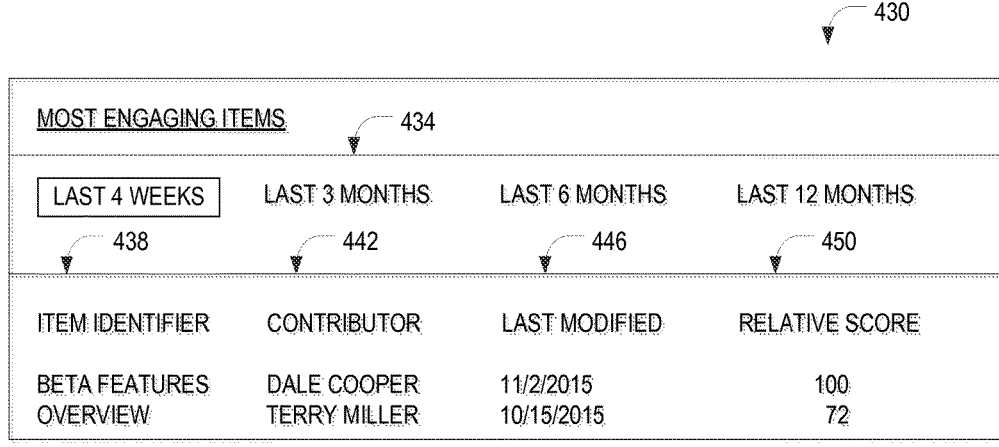
Figure 4C:
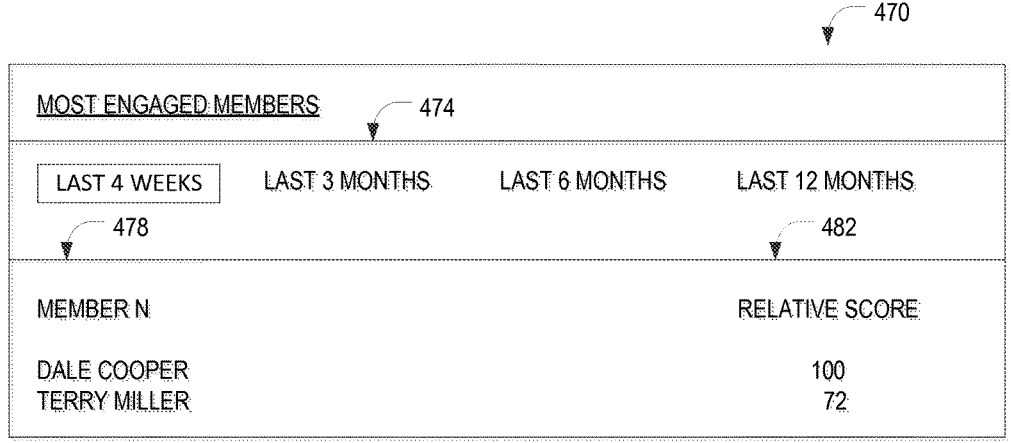

A collaboration score is computed, for example, at an item, member, and group granularity. Thus, items, members, and groups can be sorted based on their collaboration score to produce leader boards where, for example, members that perform more actions on items and items that are acted upon more frequently are generally ranked higher than members performing less actions on items and items that are acted upon less frequently. Leaderboards can be normalized to the leader for better visualization, as illustrated in FIGS. 4A-4C.

Figure 1B:
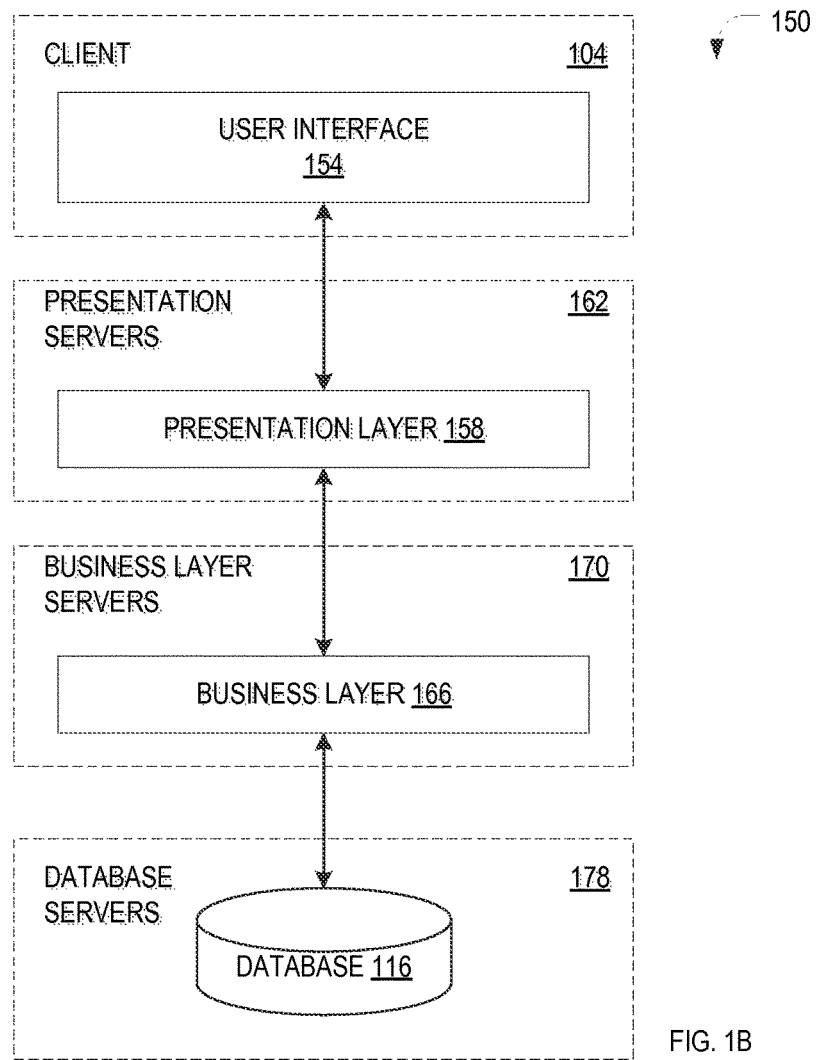

FIGS. 1A and 1B illustrate schematic diagrams of example systems 100, 150 for monitoring collaboration between members of a group and providing feedback that includes a collaboration metric(s), in accordance with an example embodiment. Traditional client-server systems may employ a two-tiered architecture such as that illustrated by the system 100 in FIG. 1A. An application 108 executed on a client device 104 of the two-tiered architecture may be comprised of a monolithic set of program code including a graphical user interface (GUI) component, presentation logic, business logic, and a network interface that enables the client device 104 to communicate over a network with one or more servers 112. A database 116 may be maintained on the server 112 that provides non-volatile or "persistent" storage for the data accessed and/or processed by the application 108.

The "business logic" component of the application 108 may represent the core program code of the application 108, i.e., the rules governing the underlying business process (or other functionality) provided by the application 108. The "presentation logic" may describe the specific manner in which the results of the business logic are formatted for display on the user interface. The database 116 may include data access logic used by the business logic to store and retrieve data.

In response to limitations associated with the two-tiered client-server architecture, a multi-tiered architecture has been developed, as illustrated in FIG. 1B. In the multi-tiered system 150, a presentation layer 158, a business layer 166, and a database 116 may be logically separated from a user interface 154 of the application 108. These layers may be moved off of the client device 104 to one or more dedicated servers on the network. For example, the presentation layer 158, the business layer 166, and the database 174 may each be maintained on separate servers (e.g., presentation servers 162, business layer servers 170, and database servers 178).

This separation of logical components and the user interface 154 may provide a more flexible and scalable architecture compared to that provided by the two-tiered model of the system 100 in FIG. 1A. For example, the separation may ensure that all clients share a single implementation of the business layer 166. If business rules change, changing the current implementation of the business layer 166 to a new version may not call for updating any client-side program code. In addition, the presentation layer 158 may be provided, which generates code for a variety of different user interfaces 154, which may be standard browsers.

In one embodiment, social software is implemented as software-as-a-service (SaaS) on, for example, the server 112 or the business layer servers 170, such that the system 100, 150 contains both a data storage unit and the algorithm necessary to compute the collaboration score. As users interact with the software via standard web browsers, the system 100, 150 captures groups, members, items, interaction data, and metadata, and stores them in data structures in, for example, the database 116. Whenever a user issues a request for a collaboration score, the system 100, 150 retrieves the latest historical information from storage as input, computes the score, and outputs the result in, for example, a "dashboard," which is a predefined GUI region of, for example, a GUI of the client device 104.

Figure 2:
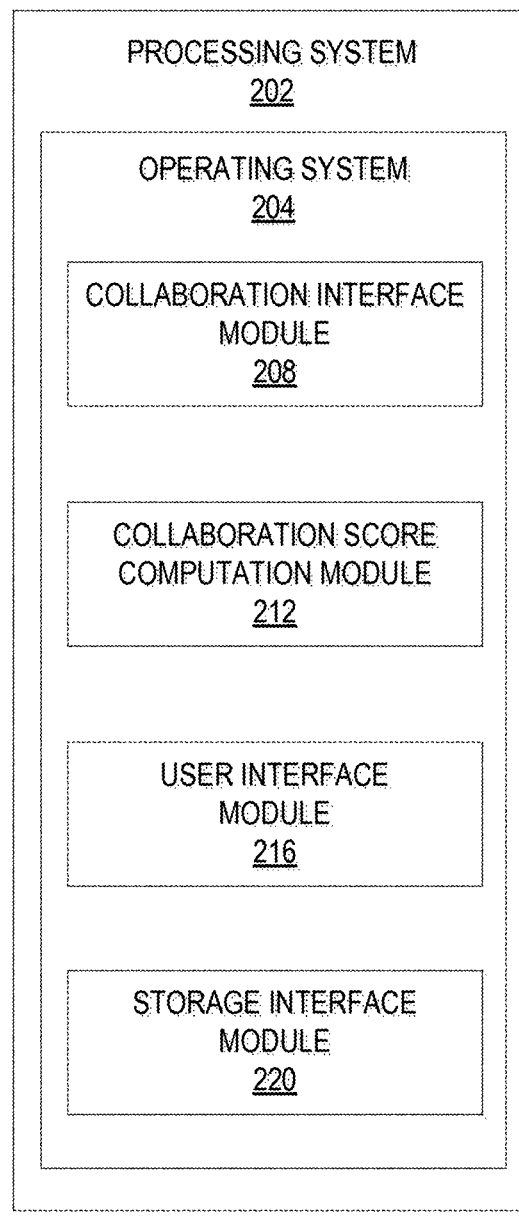
FIG. 2 is a block diagram of an example apparatus for monitoring collaboration between members of a group and providing feedback that includes a collaboration metric(s), in accordance an example embodiment.

FIG. 2 is a block diagram of an example apparatus 200 for monitoring collaboration between members of a group and providing feedback that includes a collaboration metric(s), in accordance an example embodiment. The apparatus 200 is shown to include a processing system 202 that may be implemented on a server, client, or other processing device that includes an operating system 204 for executing software instructions. In accordance with an example embodiment, the apparatus 200 includes a collaboration interface module 208, a collaboration score computation module 212, a user interface module 216, and a storage interface module 220. The storage interface module 220 provides an interface for accessing various data structures, such as tables of the database 116.

The collaboration interface module 208 interfaces to various data sources, such as the database 116 and/or a social software application, to obtain data used to compute a collaboration score. For example, the collaboration interface module 208 may obtain a count of members of a group G, a count of items of the group G, and a count of times each member m performed an action a on an item i, for a=0, . . . A and i=0, . . . I.

The collaboration score computation module 212 computes the collaboration score(s), as described by way of example below in conjunction with FIG. 3. For example, the collaboration score computation module 212 computes the member-item score $Q_{m,i}=V(\vec{A}_{m,i}) \cdot \vec{C}_G$ and the collaboration score $Q_G = \Sigma_{\forall m \in M} \Sigma_{\forall i \in I} Q_{m,i}$.

The user interface module 216 enables a user to initiate the computation of the collaboration score(s). (It is noted that the computation of the collaboration score may also be initiated by other entities, such as an application or other software entity.) The user interface module 216 may also generate a user interface to provide collaboration monitoring data, such as the collaboration score $Q_G$, as described by way of example below in conjunction with FIGS. 4A-4C.

Figure 3:
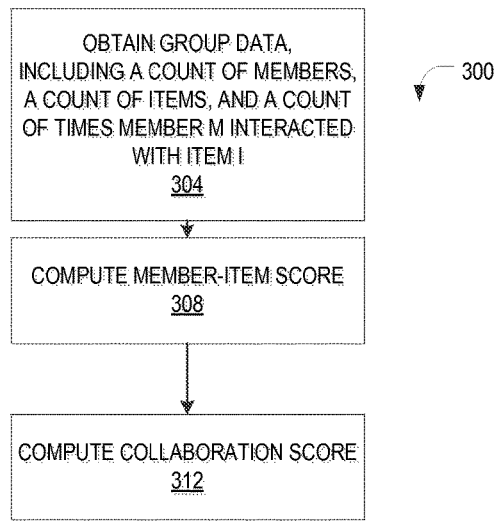
FIG. 3 shows a flowchart of an example method for monitoring a collaboration between members of a group and providing feedback that includes a collaboration metric(s), in accordance with one example embodiment.

FIG. 3 shows a flowchart of an example method 300 for monitoring collaboration between members of a group and providing feedback that includes a collaboration metric, in accordance with one example embodiment. In an example embodiment, one or more of the operations of the method 300 may be performed by the collaboration interface module 208 and/or the collaboration score computation module 212.

In one example embodiment, a count of group members, a count of group items, and a count of times each member m performed an action a on an item i (for a=0, . . . A and i=0, . . . I) corresponding to group G are obtained (operation 304). In one example embodiment, the obtaining is performed for each time quantum $T_q$, where the time quantum $T_q$ is a fixed-length amount of time with an arbitrary start point.

In one example embodiment, the member-item score $Q_{m,i}=V(\vec{A}_{m,i}) \cdot \vec{C}_G$ is computed for a time quantum $T_q$ (operation 308). As noted above, the time quantum $T_q$ is a fixed-length amount of time with an arbitrary start point, vector $\vec{A}_{m,i}$ is defined as vector comprising a component for each type of action a that a member m can perform utilizing the item i, and V is a valuation function that values each action component in the action vector $\vec{A}_{m,i}$ and generates a valued action vector $V(\vec{A}_{m,i})$. In one example embodiment, each component of the coefficient vector is defined as $$C_a = \frac{K_{ca}}{|M| \times |I_{NZ}|},$$

where |M| is the count of members in group G and $|I_{NZ}|$ is a total count of items i in the group G which have a non-zero action vector and $I_{NZ}$ is a subset of items of group G where at least one member m has performed at least one action a on the item i during the time period $T_q$.

The collaboration score of the group $Q_G$ is computed (operation 312). In one example embodiment, the collaboration score is defined as $Q_G = \Sigma_{\forall m \in M} \Sigma_{\forall i \in I} Q_{m,i}$.

FIGS. 4A-4C are graphical representations of example user interfaces 400, 430, 470 for monitoring collaboration between members of a group, in accordance with an example embodiment. The user interface 400 of FIG. 4A provides an overview of the health of collaboration between members of a group G. Pane 404 shows a count of group members, a count of group followers, and a count of members who were actively engaged in collaborating with other members of the group. Selecting the View Details link enables a user to view details of the group members, such as view a list of the names of the members. The overall collaboration score for a specified time period is shown in pane 408. Selecting the View Details link enables a user to view details of the collaboration score, such as the member-item scores described above.

Pane 412 shows an overview of the most engaging items, including the name (or other identifier) of the item. Selecting the View Details link enables a user to view details of the most engaged items, such as viewing the identification of the most engaged items. In one example embodiment, selecting the View Details link spawns the leaderboard of FIG. 4B. Pane 416 shows an overview of the most engaged members of the group, including the names of some members and their corresponding member score. Selecting the View Details link enables a user to view details of the most engaged members, such as view the name (or other identifier) of the most engaged members. In one example embodiment, selecting the View Details link spawns the leaderboard of FIG. 4C.

The user interface 430 of FIG. 4B shows a leaderboard for the most engaged items of the group G. Pane 434 enables a user to select a time period $T_q$ for the leaderboard. Column 438 shows the name (or other identifier) of each item (ranked according to the level of engagement), column 442 shows the name of the member who contributed the item, column 446 shows the date the item was last modified, and column 450 shows the item's relative collaboration score. In one example embodiment, the relative collaboration score is computed by assigning a score of 100 to the top ranked item and normalizing the score(s) of the remaining ranked item(s) to the top ranked item's score. For example, if the top item's score is five and the score of the next item is two, the top ranked item is assigned a score of 100 and the second ranked item is assigned a score of: 100*2/5=40.

The user interface 470 of FIG. 4C shows a leaderboard for the most engaged members of the group G. Pane 474 enables a user to select a time period $T_q$ for the leaderboard. Column 478 shows the name (or other identifier) of each member (ranked according to the level of engagement), and column 482 shows the member's relative collaboration score. In one example embodiment, the member's relative collaboration score is computed by assigning a score of 100 to the top ranked member and normalizing the score(s) of the remaining ranked member(s) to the top ranked member's score, as described above for the relative collaboration score of an item.

EXAMPLE COMPUTATIONS

In one example, a group G has 3 members: Alan (A), Bob (B), and Charlie (C) and three items regarding xylophones (X), yachts (Y), and zodiacs (Z). The following illustrate the computation of collaboration scores for time period $T_q$ (the week of Nov. 1 to Nov. 7, 2015, i.e., all considered actions occurred during the specified week).

Example 1: Normal Usage

In this example, the only permitted actions for the group G are viewing items and commenting on items. During the specified week, member A viewed item X five times, made three comments on item X, and only viewed item Y once. Member B viewed item X two times and viewed item Y five times. Member C was on vacation and did not interact with any items during the week. In this example:

$\vec{A}_{A,X}$=[5,3], $\vec{A}_{A,Y}$=[1,0], $\vec{A}_{A,Z}$=[0,0]

$\vec{A}_{B,X}$=[2,0], $\vec{A}_{B,Y}$=[5,0], $\vec{A}_{B,Z}$=[0,0]

$\vec{A}_{C,X}$=[0,0], $\vec{A}_{C,Y}$=[0,0], $\vec{A}_{C,Z}$=[0,0]

Since no member interacted with item Z, it does not count as part of $I_{NZ}$ and $|I_{NZ}|$=2. As noted above, G has 3 members, so $|M|$=3. All calculations of member C and item Z may be excluded from the calculations as they will result in zero values. The valuations functions used for group G (which were chosen for simplicity and satisfy equations 5, 6, and 9) are as follows:

$V_{VIEW}(n)=1-e^{-n}$, $V_{COMMENT}(n)=1-e^{-2 \times n}$.

The co-efficient vector (which favors comments as three times more valuable than views) is:

$$\vec{C_G} = \left[\frac{1}{2 \times 3}, \frac{3}{2 \times 3}\right] = \left[\frac{1}{6}, \frac{1}{2}\right]$$

where the denominator is $|M| \times |I_{NZ}|$). Based on equation (9) and this choice of coefficients, the maximum possible group score is four. For the view action: $k_{va}$=1, $k_{ca}$=1; and for the comment action: $k_{va}$=1, $k_{ca}$=3. In this case, the valuations are:

$V(\vec{A}_{A,X})=[1-e^{-5}, 1-e^{-2 \times 3}]=[0.932, 0.9975]$ $V(\vec{A}_{Z,Y})=[1-e^{-1}, 1-e^{-2 \times 0}]=[0.6321, 0]$ $V(\vec{A}_{B,X})=[1-e^{-2}, 1-e^{-2 \times 0}]=[8.8646, 0]$ $V(\vec{A}_{B,Y})=[1-e^{-5}, 1-e^{-2 \times 0}]=[0.9932, 0]$ Using the above computations and Equation 4:

$$Q_{A,X} = [0.9932, 0.9975] \cdot \left[\frac{1}{6}, \frac{1}{2}\right] = 0.6642$$

$$Q_{A,Y} = [0.6321, 0] \cdot \left[\frac{1}{6}, \frac{1}{2}\right] = 0.1053$$

$$Q_{B,X} = [0.8646, 0] \cdot \left[\frac{1}{6}, \frac{1}{2}\right] = 0.1441$$

$$Q_{B,Y} = [0.9932, 0] \cdot \left[\frac{1}{6}, \frac{1}{2}\right] = 0.1655$$

Using Equation 1:

$Q_A$=0.6642+0.1053=0.7695

$Q_B$=0.1441+0.1655=0.3096

Using Equation 2:

$Q_X$=0.6642+0.1441=0.8083

$Q_Y$=0.1053+0.1655=0.2708

Using Equation 3:

$Q_G$=0.6642+0.1053+0.1441+0.1655=1.0791

In this example, $Q_G$ is 1.0791 out of a maximum possible score of four. All scores can be multiplied by 25 to be normalized to from 0 to 100. In this case, $Q_G$=26.9775. Member A is the top ranked member on the member leaderboard. In the normalized leaderboard, member A will have a score of 100, and member B will have a score of: $100*Q_B/Q_A$=40.2339. Item X is the top ranked item on the item leaderboard with a score of 100 and item Y has a normalized score of: $100*Q_Y/Q_X$=33.5024.

Example 2: Collaboration from Multiple Action Categories

In one example, a group G allows three types of actions: viewing, downloading, and commenting. Downloading is a different action compared to viewing, but falls within the general category of "consuming" content. The collaboration score treats downloading as being half as important as viewing. As in Example 1, member A viewed item X five times, commented on item X three times and, additionally, downloaded item X twice. In this example, the action vector is:

$\vec{A}_{A,X}$=[5,3,2](views, comments, downloads, respectively)

The valuations function for viewing changes to:

$V_{CONSUMPTION}$(views, downloads)=$1-e^{-views-downloads/2}$

As a result:

$V(\vec{A}_{A,X})=[1-e^{-5-2/2}, 1-e^{-2 \times 3}]=[0.9975, 0.9975]$

The remainder of computations follow as in Example 1.

Example 3: Collaboration on Different Item Types

Beginning with Example 1, assume items X and Y are different content types: item X is a wiki page and item Y is a blog post. Viewing a wiki is expected to have a different value than viewing a blog post. However, commenting on either type of content yields the same value. To achieve this, the action vector looks like:

$\vec{A}_{m,i}$=[views of type X, views of type Y, comments]

Views of item type X is the number of times item i was viewed by member m, assuming that item i is of item type X. If item i is not of item type X, then, no matter how many times member m viewed item i, the value is zero. Therefore, the action vector is:

$\vec{A}_{A,X}$=[5,0,3], $\vec{A}_{A,Y}$=[0,1,0]

$\vec{A}_{B,X}$=[2,0,0], $\vec{A}_{B,Y}$=[0,5,0]

Valuation functions, such as the following, may be used:

$V_{VIEW\ OF\ TYPE\ X}$(views_x)=$1-e^{-views\_x}$ $V_{VIEW\ OF\ TYPE\ Y}$(views_y)=$1-e^{-5 \times views\_y}$=>

(i.e., assign more value to viewing blog posts than viewing wiki's)

Combining the two functions gives the viewing valuation function of:

$V_{VIEW}$(views_x, views_y)=$(1-e^{-views\_x})+(1-e^{-5 \times views\_y})$ $V_{COMMENT}(n)=1-e^{-2 \times n}$ The rest of the computations are trivial.

Example 4: Collaboration by Different Member Roles

Beginning with Example 1, actions are desired to be valued based on member roles. Member A is the group owner with extra privileges while member B is a normal member. Similar to Example 3, the actions of the owner can be quantified differently by changing the action vector to look like:

$$\vec{A}_{m,i}=[\text{views as owner, views a member, comments}]$$

where views by an owner will be non-zero if member m is the group owner. For example, member A viewing item i once yields a score that is twice as much as member B viewing the same item i once. The rest of the computations are similar to Example 3.

Example 5: Mixed Actions, Item Types, and Member Roles

The methods of Examples 2, 3, and 4 can be combined together to provide per action, per item type, and per member role methods of computing the collaboration score.

Figure 5:
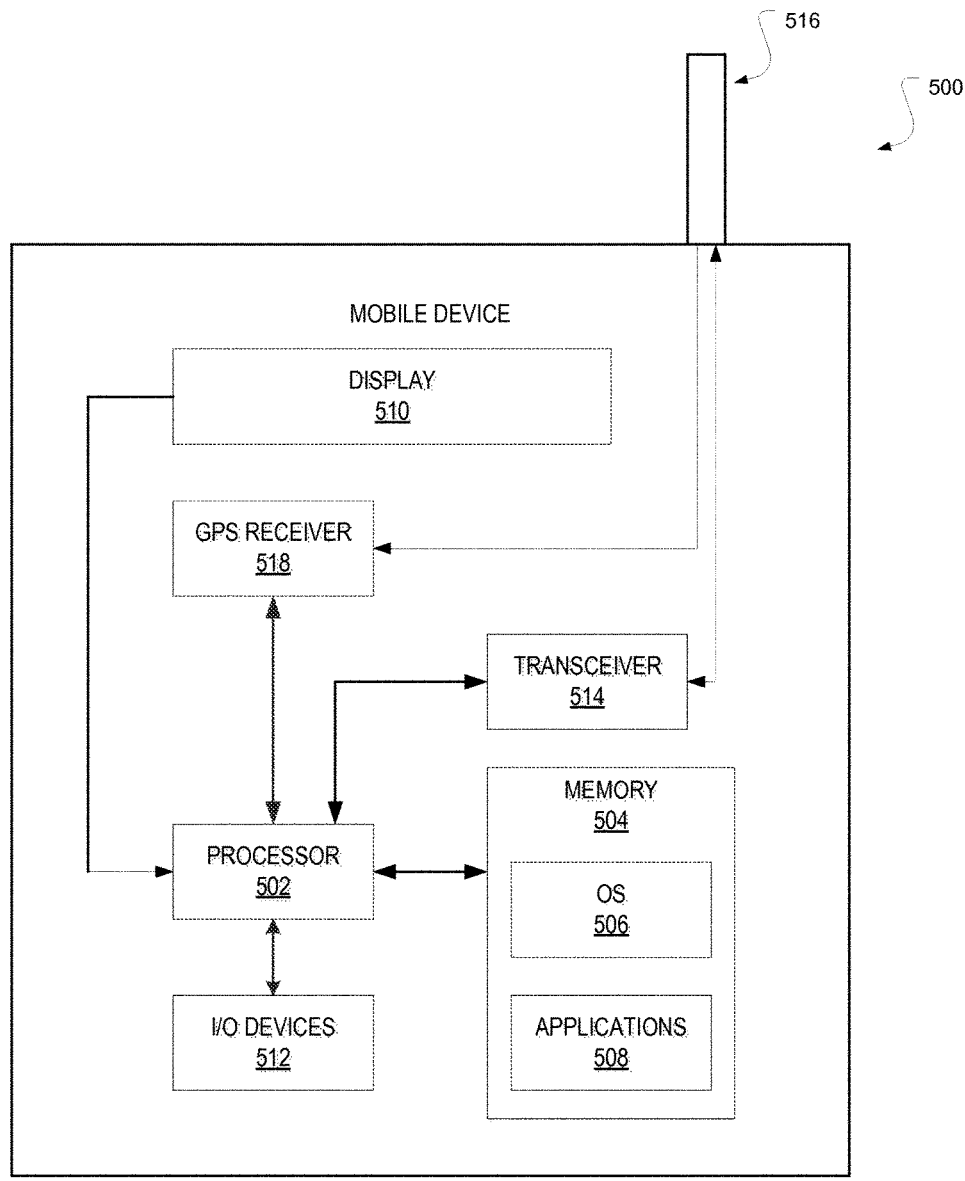
FIG. 5 is a block diagram illustrating a mobile device, according to an example embodiment.

FIG. 5 is a block diagram illustrating a mobile device 500, according to an example embodiment. The mobile device 500 can include a processor 502. The processor 502 can be any of a variety of different types of commercially available processors suitable for mobile devices 500 (for example, an XScale architecture microprocessor, a Microprocessor without Interlocked Pipeline Stages (MIPS) architecture processor, or another type of processor). A memory 504, such as a random access memory (RAM), a Flash memory, or other type of memory, is typically accessible to the processor 502. The memory 504 can be adapted to store an operating system (OS) 506, as well as applications 508, such as a mobile location enabled application that can provide location-based services (LBSs) to a user. The processor 502 can be coupled, either directly or via appropriate intermediary hardware, to a display 510 and to one or more input/output (I/O) devices 512, such as a keypad, a touch panel sensor, and a microphone. Similarly, in some embodiments, the processor 502 can be coupled to a transceiver 514 that interfaces with an antenna 516. The transceiver 514 can be configured to both transmit and receive cellular network signals, wireless data signals, or other types of signals via the antenna 516, depending on the nature of the mobile device 500. Further, in some configurations, a global positioning system (GPS) receiver 518 can also make use of the antenna 516 to receive GPS signals.

Figure 6:
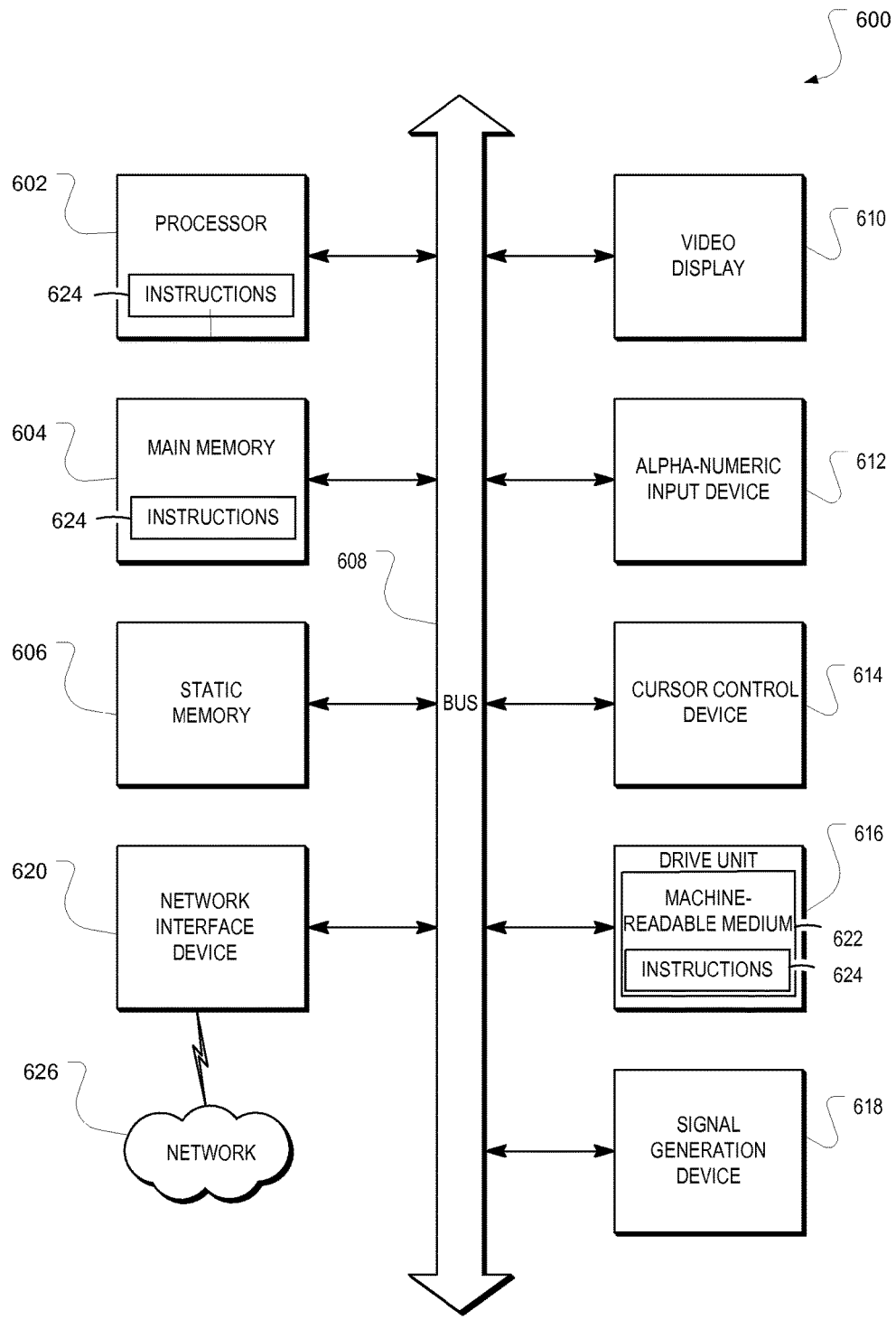
FIG. 6 is a block diagram of a computer processing system within which a set of instructions may be executed for causing a computer to perform any one or more of the methodologies discussed herein.

FIG. 6 is a block diagram of a computer processing system 600 within which a set of instructions 624 may be executed for causing a computer to perform any one or more of the methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment.

In addition to being sold or licensed via traditional channels, embodiments may also, for example, be deployed by software-as-a-service (SaaS), application service provider (ASP), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 600 includes a processor 602 (e.g., a central processing unit (CPU), a graphics processing unit (GPU), or both), a main memory 604, and a static memory 606, which communicate with each other via a bus 608. The computer processing system 600 may further include a video display 610 (e.g., a plasma display, a liquid crystal display (LCD), or a cathode ray tube (CRT)). The computer processing system 600 also includes an alphanumeric input device 612 (e.g., a keyboard), a user interface (UI) navigation device 614 (e.g., a mouse and/or touch screen), a drive unit 616, a signal generation device 618 (e.g., a speaker), and a network interface device 620.

The drive unit 616 includes a machine-readable medium 622 on which is stored one or more sets of instructions 624 and data structures embodying or utilized by any one or more of the methodologies or functions described herein. The instructions 624 may also reside, completely or at least partially, within the main memory 604, the static memory 606, and/or within the processor 602 during execution thereof by the computer processing system 600, the main memory 604, the static memory 606, and the processor 602 also constituting tangible machine-readable media 622.

The instructions 624 may further be transmitted or received over a network 626 via the network interface device 620 utilizing any one of a number of well-known transfer protocols (e.g., Hypertext Transfer Protocol).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions 624. The term "machine-readable medium" shall also be taken to include any medium that is capable of storing, encoding, or carrying a set of instructions 624 for execution by the computer and that cause the computer to perform any one or more of the methodologies of the present application, or that is capable of storing, encoding, or carrying data structures utilized by or associated with such a set of instructions 624. The term "machine-readable medium" shall accordingly be taken to include, but not be limited to, solid-state memories and optical and magnetic media.

While the embodiments of the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method for administering social software, the method comprising:
   accessing, using one or more hardware processors, a database including a plurality of groups of members, each group of members comprising members that are users of the social software, each group of members having a plurality of data items associated with the group, each data item corresponding to content posted by a corresponding member of the group via the social software, wherein a count of members of the group and a count of data items of the group is obtained for a time quantum;
   for each interaction between a specified member of the group and a specified data item associated with the group, updating the database to include a member-item count for the corresponding member of the group;
   deriving, using one or more hardware processors, a member collaboration score for each member in the group, the member collaboration score indicating a level of interaction through the social software between the member and the plurality of data items associated with the group, the member collaboration score being determined from the member-item counts corresponding to the member;
   deriving, using one or more hardware processors, a group collaboration score for each group, the group collaboration score for a specified group indicating a level of interaction through the social software for members of the specified group, the group collaboration score being determined from the member collaboration score for each member in the group; and
   serving, using one or more hardware processors, a user interface to an administrator user, the user interface comprising an indication of a group collaboration score for a first group of the plurality of groups and a plurality of member scores for members of the first group.

2. The computerized method of claim 1, wherein the member-item count is defined by $Q_{m,i}=V(\vec{A}_{m,i})\cdot \vec{C}_G$ for a time quantum $T_q$, where the time quantum $T_q$ is a fixed-length amount of time with an arbitrary start point, an action vector $\vec{A}_{m,i}$ is defined as a vector comprising an action component for each type of action a that a member m can perform utilizing a data item i, V is a valuation function which values each action component in the action vector $\vec{A}_{m,i}$ and generates a valued action vector $V(\vec{A}_{m,i})$.

3. The computerized method of claim 2, wherein the action vector $\vec{A}_{m,i}$ and the valued action vector $V(\vec{A}_{m,i})$ have a different number of dimensions.

4. The computerized method of claim 1, wherein the member collaboration score denotes how much a member m interacts with all data items I in the group, and is defined by $Q_m=\Sigma_{\forall i\in I}Q_{m,i}$.

5. The computerized method of claim 2, wherein the valuation function satisfies the following conditions:

$$V_a(0) = 0$$

$$\lim_{n\to\infty} V_a(n) = K_{va}$$

where $V_a(n)$ represents a value of the member performing an action a a total of n times during the time quantum $T_q$, and $K_{va}$ is a constant signifying a maximum valuation for the action a during time quantum $T_q$.

6. The computerized method of claim 2, wherein each component of the coefficient vector $\vec{C}_G$ is defined as $$C_a = \frac{K_{ca}}{|M|\times|I_{NZ}|},$$

where |M| is the count of members m in the group, $|I_{NZ}|$ is a total count of data items i in the group which have a non-zero action vector, and $I_{NZ}$ is a subset of data items I of the group where at least one member m has performed at least one action a on the data item i during the time period $T_q$.

7. The computerized method of claim 1, further comprising:
   computing a frequency distribution function, the frequency distribution function being a histogram of a count of times a defined type of action is performed by one or more members of one or more groups;
   converting the frequency distribution function into a probability distribution function by dividing each entry in the histogram by a total number of occurrences of the defined type of action;
   converting the probability distribution function into a cumulative distribution function; and
   using the cumulative distribution function as a valuation function for the defined type of action.

8. The computerized method of claim 6, further comprising determining the valuation function and the coefficient vector using a machine learning technique.

9. The computerized method of claim 4, wherein the group collaboration score of the group is defined by $Q_G=\Sigma_{\forall m\in M}\Sigma_{\forall i\in I}Q_{m,i}$, where M represents the set of members in the group, I represents the set of data items in the group, and $Q_{m,i}$ represents the member-item count for member m and data item i.

10. The computerized method of claim 1, wherein a member is any entity that is capable of performing the content posting.

11. The computerized method of claim 1, further comprising:
   for each interaction between the specified member of the group and the specified data item associated with the group, updating the database to include an member-item count for the corresponding data item associated with the group; and
   deriving, using one or more hardware processors, an item collaboration score for each data item in the group, the item collaboration score being determined from the member-item counts of the corresponding data item, the group collaboration score for each group also determined from the item collaboration score.

12. The computerized method of claim 11, wherein the item collaboration score denotes how much an item i is being acted upon by all members M in the group, and is defined by $Q_i=\Sigma_{\forall m\in M}Q_{m,i}$.

13. The computerized method of claim 1, wherein the member-item count is a count of interactions between the specified member and the specified data item.

14. An apparatus for administering social software, the apparatus comprising:
   one or more hardware processors;
   memory to store instructions that, when executed by the one or more hardware processors perform operations comprising:

accessing, using one or more hardware processors, a database including a plurality of groups of members, each group of members comprising members that are users of the social software, each group of members having a plurality of data items associated with the group, each data item corresponding to content posted by a corresponding member of the group via the social software wherein a count of members of the group and a count of data items of the group is obtained for a time quantum;

for each interaction between a specified member of the group and a specified data item associated with the group, updating the database to include a member-item count for the corresponding member of the group;

deriving, using one or more hardware processors, a member collaboration score for each member in the group, the member collaboration score indicating a level of interaction through the social software between the member and the plurality of data items associated with the group, the member collaboration score being determined from the member-item counts corresponding to the member;

deriving, using one or more hardware processors, a group collaboration score for each group, the group collaboration score for a specified group indicating a level of interaction through the social software for members of the specified group, the group collaboration score being determined from the member collaboration score for each member in the group; and serving, using one or more hardware processors, a user interface to an administrator user, the user interface comprising an indication of a group collaboration score for a first group of the plurality of groups and a plurality of member scores for members of the first group.

15. The apparatus of claim 14, wherein the member-item count is defined by $Q_{m,i} = V(\vec{A}_{m,i}) \cdot \vec{C}_G$ for a time quantum $T_q$, where the time quantum $T_q$ is a fixed-length amount of time with an arbitrary start point an action vector $\vec{A}_{m,i}$ is defined as a vector comprising an action component for each type of action a that a member m can perform utilizing a data item i, V is a valuation function which values each action component in the action vector $\vec{A}_{m,i}$ and generates a valued action vector $V(\vec{A}_{m,i})$.

16. The apparatus of claim 14, wherein the member collaboration score denotes how much a member m interacts with all data items I in the group, and is defined by $Q_m = \Sigma_{\forall i \in I} Q_{m,i}$.

17. The apparatus of claim 14, the operations further comprising:

for each interaction between the specified member of the group and the specified data item associated with the group, updating the database to include an member-item count for the corresponding data item associated with the group; and deriving, using one or more hardware processors, an item collaboration score for each data item in the group, the item collaboration score being determined from the member-item counts of the corresponding data item, the group collaboration score for each group also determined from the item collaboration score.

18. The apparatus of claim 15, wherein each component of the coefficient vector $\vec{C}_G$ is defined as $$C_a = \frac{K_{ca}}{|M| \times |I_{NZ}|},$$

where |M| is the count of members m in the group, $|I_{NZ}|$ is a total count of data items i in the group which have a non-zero action vector, and $I_{NZ}$ is a subset of data items I of the group where at least one member m has performed at least one action a on the data item i during the time period $T_q$.

19. The apparatus of claim 17, wherein the item collaboration score denotes how much an item i is being acted upon by all members M in the group, and is defined by $Q_i = \Sigma_{\forall m \in M} Q_{m,i}$.

* * * * *